United States Patent [19]

Schramm

[11] Patent Number: 5,673,112

[45] Date of Patent: Sep. 30, 1997

[54] METHOD FOR DETECTING COLOR CONTAMINATION

[75] Inventor: Peter Schramm, Frankfurt am Main, Germany

[73] Assignee: MAN Roland Druckmaschinen AG, Germany

[21] Appl. No.: 620,242

[22] Filed: Mar. 22, 1996

[30] Foreign Application Priority Data

Mar. 25, 1995 [DE] Germany ............... 195 11 076.5

[51] Int. Cl.⁶ ........................................ G01J 3/50
[52] U.S. Cl. ........................................ 356/402
[58] Field of Search ................... 356/402, 405, 356/406, 407, 416, 425, 419; 250/226

[56] References Cited

U.S. PATENT DOCUMENTS 5,182,721 1/1993 Kipphan et al. ............... 356/526

FOREIGN PATENT DOCUMENTS 0 228 347 B1 7/1987 European Pat. Off. .

OTHER PUBLICATIONS

DE-X "Offsetpraxis Dec. 1983," pp. 34ff.
KFK-PDV 177 "Mikrorechner-Regelsystem fur den Farblub von Bogenoffsetmaschinen [Microprocessor control systems for the ink flow of sheet-fed offset printing machines]", Dec. 1977, p. 19ff.

Primary Examiner—F. L. Evans
Attorney, Agent, or Firm—Leydig, Voit & Mayer, Ltd.

[57] ABSTRACT

A method is described for detecting color contamination in the production of color printed products, in particular printed products which are produced on offset printing machines. By means of densitometric measurements, in which so-called main and subsidiary color density values are determined in each case for one color in a plurality of spectral ranges, it is to be possible in a simple manner to detect color contamination. According to the invention, it is proposed for this purpose to determine a functional interrelation which describes how, in an uncontaminated color sample, the subsidiary color density behaves as a function of the associated main color density. During printing, values of the main and subsidiary color densities for the individual colors are then likewise recorded at measurement locations of sample prints. A difference in the associated subsidiary color densities is formed, the subsidiary color density of the uncontaminated color sample being extrapolated in accordance with the functional interrelation to that value which it has in the case of the detected value of the main color density of the sample. If these differential values exceed given tolerances, a warning notice is given in respect of the color contamination detected.

6 Claims, 1 Drawing Sheet

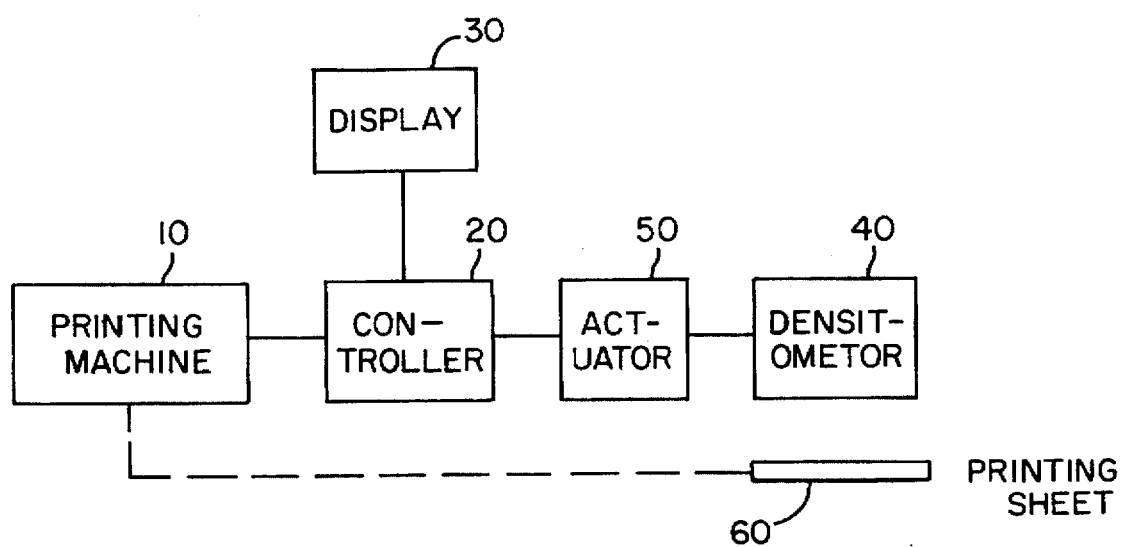
FIGURE

METHOD FOR DETECTING COLOR CONTAMINATION

BACKGROUND OF THE INVENTION

1. Field of the Invention

The present invention relates to a method for detecting color contamination, and more particularly, to a method for detecting color contamination in the production of multi-color printed products.

2. Discussion of the Related Art

In continuous printing the control of inking is the most important parameter for affecting the impression of the image. In the production of color printed products using the most varied production methods, it is known to record the inking on the printing carrier photoelectrically and to convert these measured values, e.g., reflectance values, into values from which adjustment values can be determined for any required changes to the ink supply. Especially in the case of offset printing, it has been known for a long time to carry out densitometric analysis of color measuring fields printed with the image. For example, densitometric scanning of color measuring fields, such as color test fields, color test strips, color measuring strips, and measuring patches printed together with the image results in color density values which may be compared with given desired color density values. From the difference between the desired and the actual values, adjustment commands for the zonal ink supply may then be derived in a simple manner. The adjustment commands either increase or decrease the amount of ink supplied for the image. Ink layer thickness can be controlled within certain given limits whereby thicker layers result in more saturated color impression or higher color densities and vice versa.

In this case, the advantage of densitometric monitoring of the ink supply lies in the fact that here there is an unambiguous interrelation between the ink film thicknesses applied to the printing carrier and the color density value. In order to be able to monitor the color density values of a plurality of colors when printing multi-color printed products, densitometers have been developed which have a plurality of filters, in particular spectral filters. Such a densitometer together with the appropriate application possibility is described in DE-Z "Offsetpraxis 12/1983", pages 34ff. Since in such a device a plurality of color density values always occurs in one measurement, the greatest color density value is usually applied for the inking control. This is the color density value that results through a filter which has transparency properties which are complementary to the reflectance properties of the printing color.

Especially in the production of offset printed products, the inking and thus the color impression of the printed product may vary, in particular in the case of relatively large numbers of copies, although no adjustments were made to the ink supply or any other settings of the printing machine. In this case, it has been established that these changes to the color impression are often caused by color contamination. Ink which was previously printed on in the preceding printing units passes into the following printing units due to return separation and, during this process, the color yellow, in particular, is very sensitive to admixtures of the colors blue (cyan) and red (magenta). In the case of mixed colors, such color contamination results in clearly discernible color shifts in the halftone range.

A method for controlling the ink application in a printing machine is disclosed in EP 0,228,347 B1, in which the photoelectrically recorded reflectance values are converted into color sites relating to a selected color coordinate system and the color spacing is formed from the color site of a mastersheet and the color site of the printed product. The l, u, v, and l, a, b color systems which imitate human color perception are proposed as the selected color coordinate systems. In this case, the advantage of inking control based on colorimetric information results from the fact that color changes can be recognized promptly, the latter being caused, for example, by blanket soiling or color contamination.

The advantage of colorimetry for printing-machine control lies in the illustrative representation of color site differences. However, it must be considered disadvantageous that there are very complex and non-linear interrelations which are empirically difficult to handle between color site differences or a lacuna, i.e., blank space, between a sample sheet and an O.K. sheet and the adjustment commands required for correction of the ink supply of the individual colors. A change to the film thickness of an individual color thus not only has an effect on the lightness defined in the l, u, v and l, a, b color systems, but also in the hue coordinates.

It is known from the German publication KFK-PDV 177 "Mikrorechner-Regelsystem für den Farbfluβ von Bogenoffsetmaschinen" [Microprocessor control systems for the ink flow of sheet-fed offset printing machines], December 1977, page 19ff, that it is possible to control color contamination using a densitometer having a plurality of filters. It is not specified here, however, how the plurality of color density values of a measurement sample are to be evaluated.

SUMMARY OF THE INVENTION

In the following description of the invention, the term "main color density" of a color is understood to be the greatest color density value. The main color density value for the color yellow is that color density value which has been recorded by the filter (blue filter) allocated to the color yellow. The term "subsidiary color density" is understood to mean the other color density values which are less than the value of the main color density. That is to say, in the printing color yellow, these are the color density values resulting when the color sample is measured through a green or red filter. In this case, when carrying out the method according to the present invention, a densitometer of a generally known type is applied, whose filter is matched to the measurement of the standardized printing colors yellow, cyan and magenta. In this case, this densitometer can either have a fourth filter to record the color density of the color black, in which case, however, it is also likewise possible and known to determine the color density value for the color black from the density values for the other three chromatic colors. The cause of this lies in the fact that the printing color black has in total a low degree of reflectance within the visible spectrum.

The present invention is explained by way of example during the production of a printed sheet on a multi-color offset printing machine. However, this should not be seen as a restriction of the present invention, for example, the method according to the present invention can also be applied in the production of other multi-color printed products. In this case, the basic principle according to the present invention is the fact that an uncontaminated pure color has an unambiguous correlation between the values of the main color densities and the subsidiary color densities. Accordingly, for any given color, a prediction of how greatly the subsidiary color densities will change if, due to a change in the ink supply, the film thickness on the printing carrier and thus the main color density are changed. Therefore, it is possible, after recording the main and subsidiary color densities of a color sample to be checked and after a conversion of the values of the pure color sample, which conversion has yet to be explained, and after appropriate difference formation, to detect whether there is any color contamination here and, if this is the case, which color has caused the contamination.

BRIEF DESCRIPTION OF THE DRAWINGS

The FIGURE is a block diagram representation of a system for implementing the method of the present invention.

DETAILED DESCRIPTION OF THE PREFERRED EMBODIMENTS

The method for detecting color contamination according to the present invention is explained in the exemplary embodiment for the monitoring of the color yellow; however, it should be understood that for the colors cyan, magenta and black, the procedure is analogous. It will initially be shown which approach is used for calculating the subsidiary color densities as a function of the main color density and how this can be proven experimentally.

As stated above, the main color density is the greatest color density of the particular color. In order to determine the main color density a densitometer may be utilized with a filter which has transparency properties which are complementary to the reflectance properties of the particular color. For example, for yellow, a blue filter may be utilized. The subsidiary color densities may be determined using other color filters and not one having complementary properties, for example, red and green filters. It is known by definition that the ink density is the logarithmic ratio between the light being reflected from a white reference area and the light being reflected from the copy within a definite wavelength range. For the degree of reflection of the white area a value of one (1) is used. This results in D=1/degree of reflectance of the copy, where D is the density. The ink density rises with increasing ink film thickness up to saturation. Densitometers serve to determine ink density. Essentially, densitometers are photometers (light-meters) for the visible wavelength range and adapted to the specific requirement of the printing technique.

In printing tests, a number of samples are produced for the color yellow, in which the main color density values change within a given range. In this case, the sample prints are produced in such a way that the color yellow is guaranteed to be printed uncontaminated, that is to say pure. This may be accomplished in a printing operation in which only the color yellow is printed in only one printing unit. In this case, the graduation in respect of the main color values of the samples for the color yellow takes place, for example, by means of successively increasing the ink supply. Using a densitometer of the type described above, or a spectral densitometer with digital filtering, the samples are then measured in respect of the main and subsidiary color density values. Here and in the following, full-surface samples are always measured, i.e., the recording of the measured values takes place on measuring patches or fields of the fulltone.

By means of the test described above, a table of measured values is obtained for the color yellow, each value of the main color density being assigned two values of the subsidiary color densities; namely, the corresponding measured values through the red and green filters. From this family of measured values and applying the generally known methods of reflectance calculation, a functional illustration or model of the subsidiary color densities now takes place as a function of the associated main color density. That is to say in each case an analytical illustration or model is obtained:

subsidiary color density 1=F (main color density), and subsidiary color density 2=F (main color density).

In this case, subsidiary color density 1 and subsidiary color density 2 signify the color density values which have been determined through red and green filters respectively. In this case, tests have shown that, in the case of not excessively high accuracy demands, the analytical illustration or model can be a linear approach as set forth above. However, a more precise analysis of the variations in the measured values which can be determined in this manner shows that, for example, the subsidiary color density 1 has a slightly curved course toward greater values of the main color density. That is to say the measured values run along a slightly curved parabola.

Consequently, the following analytical illustration or model is obtained: subsidiary color density 1=A1×main color density×(1+Q1×main color density), and subsidiary color density 2=A2×main color density×(1+Q2×main color density).

In accordance with the approach described above, the parameters to be determined for the color yellow thus emerge as: A1, A2, Q1, Q2. For the other colors, cyan, magenta and black, a corresponding procedure is applied so that just such parameters are obtained. To determine the parameters for the example of yellow, the quadratic equations are to be separated according to the corresponding parameters, thus resulting in:

Q1=1−subsidiary color density 1/main color density,

Q2=1−subsidiary color density 2/main color density,

A1=subsidiary color density 1/(main color density×(1+ Q1×main color density)), and A2=subsidiary color density 2/(main color density×(1+ Q2×main color density)).

According to the tests illustrated above, it is thus shown that the values of the subsidiary color densities 1, 2 can be effectively illustrated or modelled in the form of an upwardly open parabola in the case of a pure, uncontaminated color. Any contamination of the color yellow will thus be shown by a deviation of the values of the subsidiary color densities 1, 2, e.g., deviations in the parabolic course. As a consequence, the parameters A1, A2, Q1, Q2, as described above, can be determined by a single measurement on a fulltone measuring patch of the color yellow. As stated above, these results are equally applicable to the other colors.

According to the present invention, the following values are now determined during printing to monitor the color contamination on a O.K. sheet, i.e., the reference sheet, on a fulltone measuring patch of the color yellow:

O.K. main color density,

O.K. subsidiary color density 1,

O.K. subsidiary color density 2.

According to the approach of the present invention, the O.K. subsidiary color density 1 and 2 may be determined by:

O.K. subsidiary color density 1=A1×O.K. main color density×(1+Q1×O.K. main color density), O.K. subsidiary color density 2=A2×O.K. main color density×(1+Q2×O.K. main color density).

The following parameters are now determined by means of these measured values of the above equations:

Q1=1−O.K. subsidiary color density 1/O.K. main color density,

Q2=1−O.K. subsidiary color density 2/O.K. main color density,

A1=O.K. subsidiary color density 1/(O.K. main color density×(1+Q1×O.K. main color density)), A2=O.K. subsidiary color density 2/(O.K. main color density×(1+Q2×O.K. main color density)).

Printing is then commenced and the ink the color the color yellow described here and for the other colors, i.e., cyan, magenta and black is adjusted in such a way that the main color densities which can be determined on the sample sheets correspond to the O.K. main color densities, or within a given tolerance. In this case, it is valid even for the color black that the main color density is the greatest color density value.

In order to control the inking during printing, sheets are withdrawn from time to time and are measured, in particular, using an automatic, traversing densitometer. For one or more fulltone measuring patches of the color yellow, the following color density values now result:

sample main color density, sample subsidiary color density 1, sample subsidiary color density 2.

The subsidiary color density values, subsidiary color density 1, subsidiary color density 2, which have been determined on the uncontaminated yellow fulltone measuring patch (O.K. sheet) are then extrapolated in accordance with the approach described above to those values which would result in the case of the sample main color density value. The following differential values are determined: differential subsidiary color density 1=sample subsidiary color density 1−A1×sample main color density×(1+Q1×sample main color density), and differential subsidiary color density 2=sample subsidiary color density 2−A2×sample main color density×(1+Q2×sample main color density).

The difference in the subsidiary color densities 1, 2 of the yellow fulltone measuring patches of the O.K. sheet and of the sample sheet is thus determined, the values of the sample subsidiary color density 1, 2 being extrapolated, as already mentioned, in accordance with the coefficient of the quadratic approach determined on the uncontaminated color sample to those values which they would have to have in the case of the value, sample main color density.

Since the invention is based on the knowledge that the subsidiary color densities 1, 2 are a function of the main color density in the case of a pure, uncontaminated color, any contamination will now become noticeable due to the values, differential subsidiary color density 1, and differential subsidiary color density 2. Since, in the offset printing process, there is always a certain mixing of the colors, i.e., perfect color purity is not to be anticipated, certain tolerances are to be given for the values, differential subsidiary color density 1, differential subsidiary color density 2. If the differential subsidiary color density values 1, 2 described above then exceed the given tolerances, a warning notice can, for example, be displayed. The sum of the differential subsidiary color density values may be given by the sum of subsidiary color densities=differential subsidiary color density 1+differential subsidiary color density 2.

In this case too, a tolerance is given so that, if the value of the sum of the subsidiary color densities exceeds the tolerance value, a warning notice is shown on a display device. By means of this sum formation, the display of a warning notice takes place regardless of which other printing color has contaminated the color yellow, for example. In fact, however, it can be detected, by means of the deviation of the values of the subsidiary color densities from those values which would have to result in the uncontaminated state whether, for example, the color yellow (fulltone measuring patch) has been contaminated by cyan, magenta or even by black. If the value, subsidiary color density 1 is that color density value which has been measured through the red filter and color density 2 is that value of a color density which is determined through the green filter, a large value for the differential subsidiary color density i indicates that the color yellow has a large proportion of cyan. This applies correspondingly if the value, differential subsidiary color density 2 assumes a large value. Contamination by the color black is to be assumed if the values, differential subsidiary color density 1 and differential subsidiary color density 2, behave in a given manner relative to one another.

As mentioned above, the parameters A1, A2, Q1, Q2 to be determined for the color yellow may be determined on the basis of the measured values, O.K. color density, O.K. subsidiary color density 1, O.K. subsidiary color density 2 on a measuring patch of the O.K. sheet. The corresponding parameters A1, A2, Q1, Q2 for the colors cyan, magenta and black are in this case determined correspondingly likewise on fulltone measuring patches of the O.K. sheet. Since the O.K. sheet is generally printed on the machine on which the production print also takes place, the fulltone measuring patches for yellow, cyan, magenta and black can already have a certain degree of basic contamination. Since, however, the O.K. sheet shows the desired color appearance in the combined printing of the colors, this influence is taken into account in the determination of the empirical interrelation in accordance with the parameters described above. By applying the method according to the present invention, it can then be detected during the production run whether any further contamination occurs in the individual colors.

The method for detecting color contamination according to the invention is preferably used in an ink control and regulation system which is known per se. In such devices, sheets are withdrawn from time to time during production printing and these are laid on a color matching desk. By means of a traversing densitometer which provides the values described above, a control strip which is printed on the sheet is scanned. By comparing the appropriate main color density values with given desired values (O.K. main color density), zonal control of the ink supply for the individual printing colors takes place. By means of an input device, an operator now has the possibility to link up the diagnostic system according to the invention to detect color contamination for specific colors. It is thus possible for the monitoring of the color contamination to be activated for only one color, for example yellow. Furthermore, provision can be made for a so-called trend of the contamination parameters described above to be set up, that is to say an analysis, in particular of the differential subsidiary color densities 1, 2, over a large number of measurements.

Moreover, in the presence of a plurality of measuring patches distributed over the printed sheet, a local allocation of the contamination values can take place and be displayed (zonal display).

Referring to the FIGURE, there is shown a block diagram illustration of a system employing the method for detecting color contamination. The printing machine 10 may be connected to a controller 20 which may comprise a software, hardware or software/hardware controller. The controller 20 may be connected to a display 30 such as a CRT or the like for displaying the various warning messages for the system operator. The densitometer 40 may be connected to the controller 20 via an actuation system 50. The actuation system 50, via commands from the controller 20 moves the densitometer 40 over various regions of the printing sheet 60.

Although shown and described is what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A method for detecting color contamination in the production of multi-color printed products using color density values determined densitometrically for a plurality of spectral ranges for each color, where a greatest color density value for each color is the main color density and the other color density values are subsidiary color densities, the method comprising the steps of (1) determining the values of the main and the subsidiary color densities at a measurement location printed with an uncontaminated color, (2) determining the values of the main and subsidiary color densities of the same color on a printed sample, (3) and forming the difference between the values of the subsidiary color densities of steps (1) and (2), where the values of the subsidiary color densities of the uncontaminated color are extrapolated from the value of the main color density of the printed sample.

2. The method according to claim 1, wherein the subsidiary color densities of the measurement location printed with uncontaminated color are calculated as a function of the main color density in accordance with the equation given by subsidiary color density=A×main color density×(1+Q×main color density), where Q=1−subsidiary color density/main color density, and A=subsidiary color density/(main color density×(1+Q×main color density)).

3. The method according to claim 2, wherein the values of the main and subsidiary color densities for an uncontaminated color are determined on the measuring patches of an O.K. sheet.

4. The method according to claim 3, wherein the measurement location is additionally printed fulltone measuring patch of a control strip.

5. The method according to claim 4, wherein the sum of the differences in subsidiary color densities is formed to form a measure of the degree of contamination of a color.

6. The method according to claim 1, wherein determining the color density values comprises measuring color density utilizing a densitometer, the main color density values being measured utilizing the densitometer and a filter having transparency properties which are complementary to the reflectance properties of the particular color and the subsidiary color density values being measured utilizing the densitometer and filters having transparency properties which are not complementary to the reflectance properties of the particular color.

* * * * *